United States Patent
Deng et al.

(10) Patent No.: US 8,613,271 B2
(45) Date of Patent: Dec. 24, 2013

(54) ENGINE INCLUDING INTAKE AIR FLOW CONTROL ASSEMBLY

(75) Inventors: Dingfeng Deng, Auburn Hills, MI (US); Fanghui Shi, Bloomfield Hills, MI (US); Yuchuan Liu, Troy, MI (US); Bo Yang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

(21) Appl. No.: 13/204,136

(22) Filed: Aug. 5, 2011

(65) Prior Publication Data

US 2013/0032122 A1  Feb. 7, 2013

(51) Int. Cl.
*F02D 9/10* (2006.01)
*F02D 9/16* (2006.01)

(52) U.S. Cl.
USPC .......................................... 123/336; 123/337

(58) Field of Classification Search
USPC ......... 123/336, 337, 442, 319, 306, 308, 302, 123/432; 251/305, 308, 304
See application file for complete search history.

(56) References Cited

U.S. PATENT DOCUMENTS

| | | | | |
|---|---|---|---|---|
| 4,840,349 A | * | 6/1989 | Peter et al. | 251/129.11 |
| 5,325,829 A | * | 7/1994 | Iwasiuk | 123/336 |
| 7,140,349 B2 | * | 11/2006 | Hanasato | 123/336 |

* cited by examiner

*Primary Examiner* — Mahmoud Gimie
(74) *Attorney, Agent, or Firm* — Harness, Dickey & Pierce, P.L.C.

(57) ABSTRACT

An intake air flow control assembly includes an actuator, a valve shaft, a first valve member and a drive member. The actuator includes a drive shaft defining a first rotational axis. The valve shaft defines a second rotational axis. The first valve member is fixed for rotation with the valve shaft and adjusts air flow from an intake manifold to an engine intake port. The drive member is engaged with the drive shaft and the valve shaft. The drive member extends around an outer circumference of the drive shaft and around an outer circumference of the valve shaft. The drive shaft is rotatable in first and second rotational directions opposite one another to rotate the valve shaft via the drive member and rotationally displace the first valve member.

16 Claims, 4 Drawing Sheets

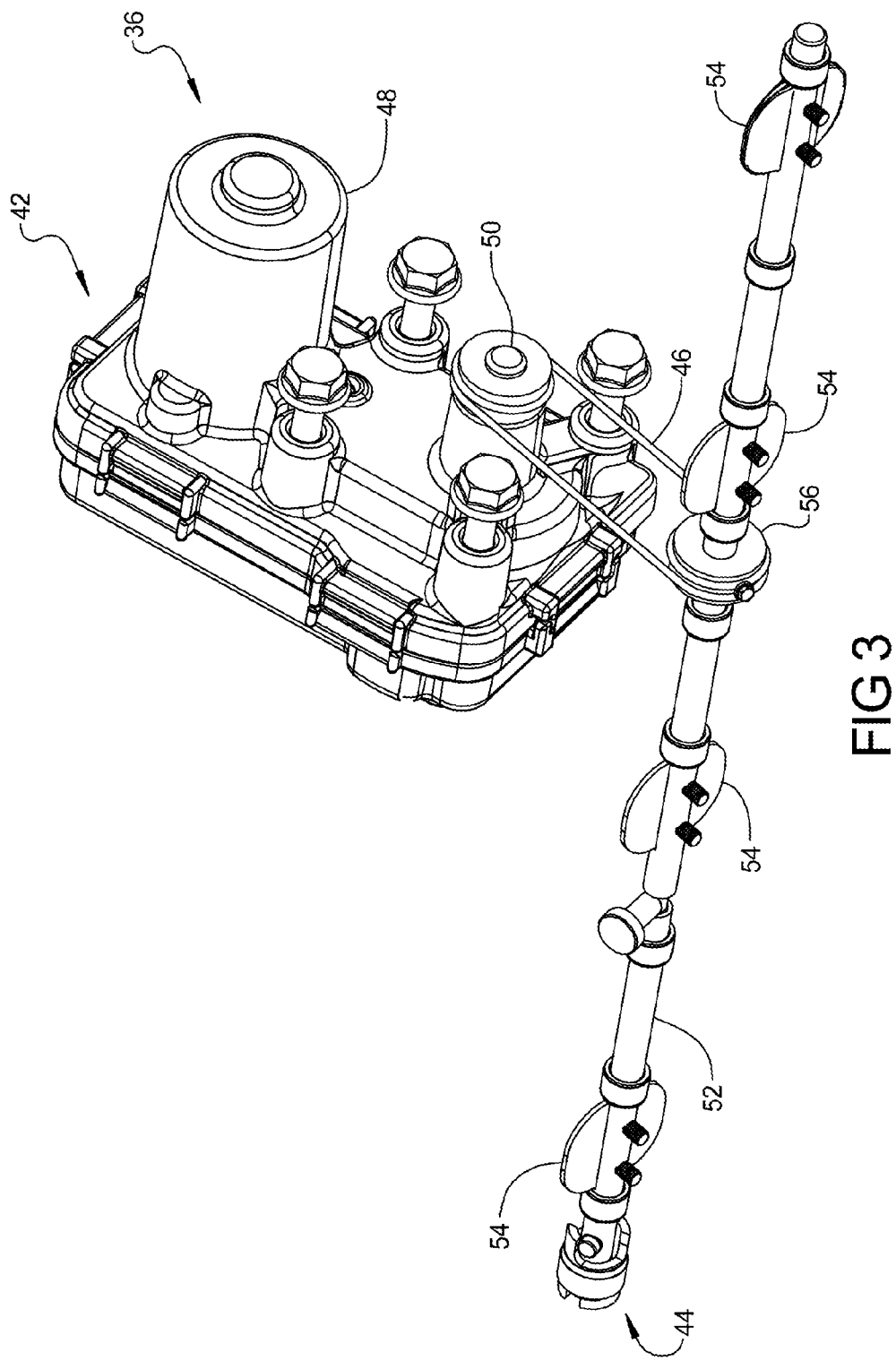

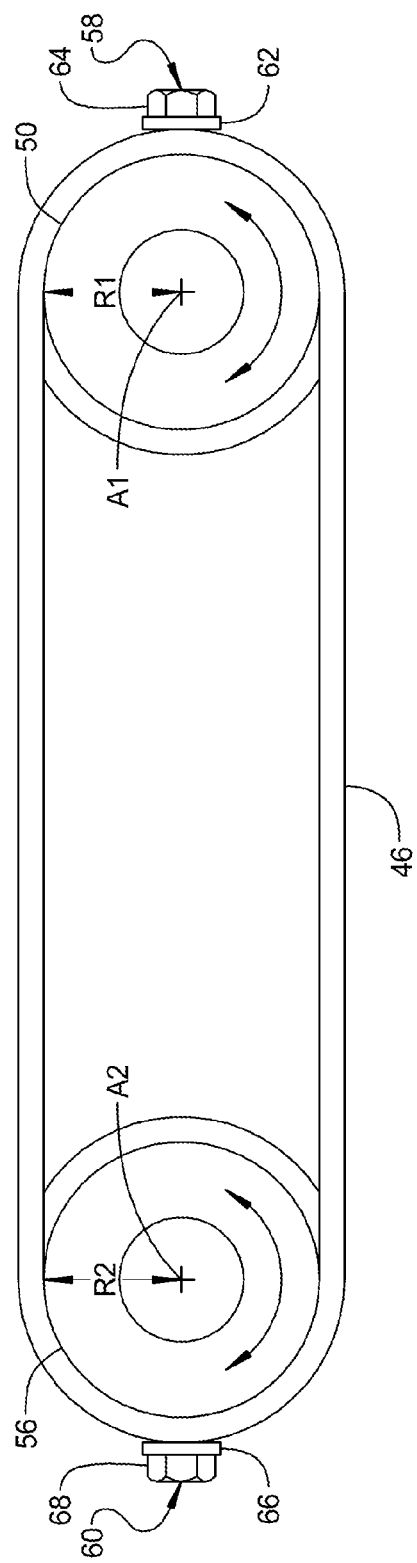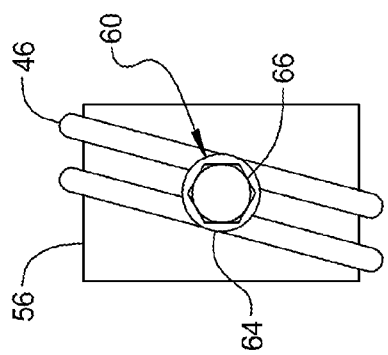

ENGINE INCLUDING INTAKE AIR FLOW CONTROL ASSEMBLY

FIELD

The present disclosure relates to engine air flow control assemblies.

BACKGROUND

This section provides background information related to the present disclosure which is not necessarily prior art.

Internal combustion engines may combust a mixture of air and fuel in cylinders and thereby produce drive torque. Air and fuel flow into and out of the cylinders may be controlled by a valvetrain. Controlling air flow into the cylinders to generate swirl or tumble flow may enhance combustion at some operating conditions. Swirl and/or tumble flow may be generated by providing an obstruction in the intake air flow path.

SUMMARY

An engine assembly may include an engine structure, an intake manifold, an intake valve and an intake air flow control assembly. The engine structure may define a cylinder and an intake port in communication with the cylinder. The intake manifold may be in communication with an air source and the intake port. The intake valve may be supported on the engine structure and may control communication between the intake port and the cylinder. The intake air flow control assembly may include an actuator, a valve shaft, a first valve member and a drive member. The actuator may include a drive shaft defining a first rotational axis. The valve shaft may define a second rotational axis. The first valve member may be fixed for rotation with the valve shaft and adapted to adjust air flow from the intake manifold to the intake port. The drive member may be engaged with the drive shaft and the valve shaft. The drive member may extend around an outer circumference of the drive shaft and around an outer circumference of the valve shaft. The drive shaft may be rotatable in first and second rotational directions opposite one another to rotate the valve shaft via the drive member and rotationally displace the first valve member to adjust air flow from the intake manifold to the intake port.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 3 is a perspective view of the intake air flow control assembly shown in FIG. 2;

FIG. 4 is a schematic illustration of the drive arrangement from the intake air flow control assembly shown in FIGS. 2 and 3; and FIG. 5 is an additional schematic illustration of the drive arrangement from the intake air flow control assembly shown in FIGS. 2 and 3.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
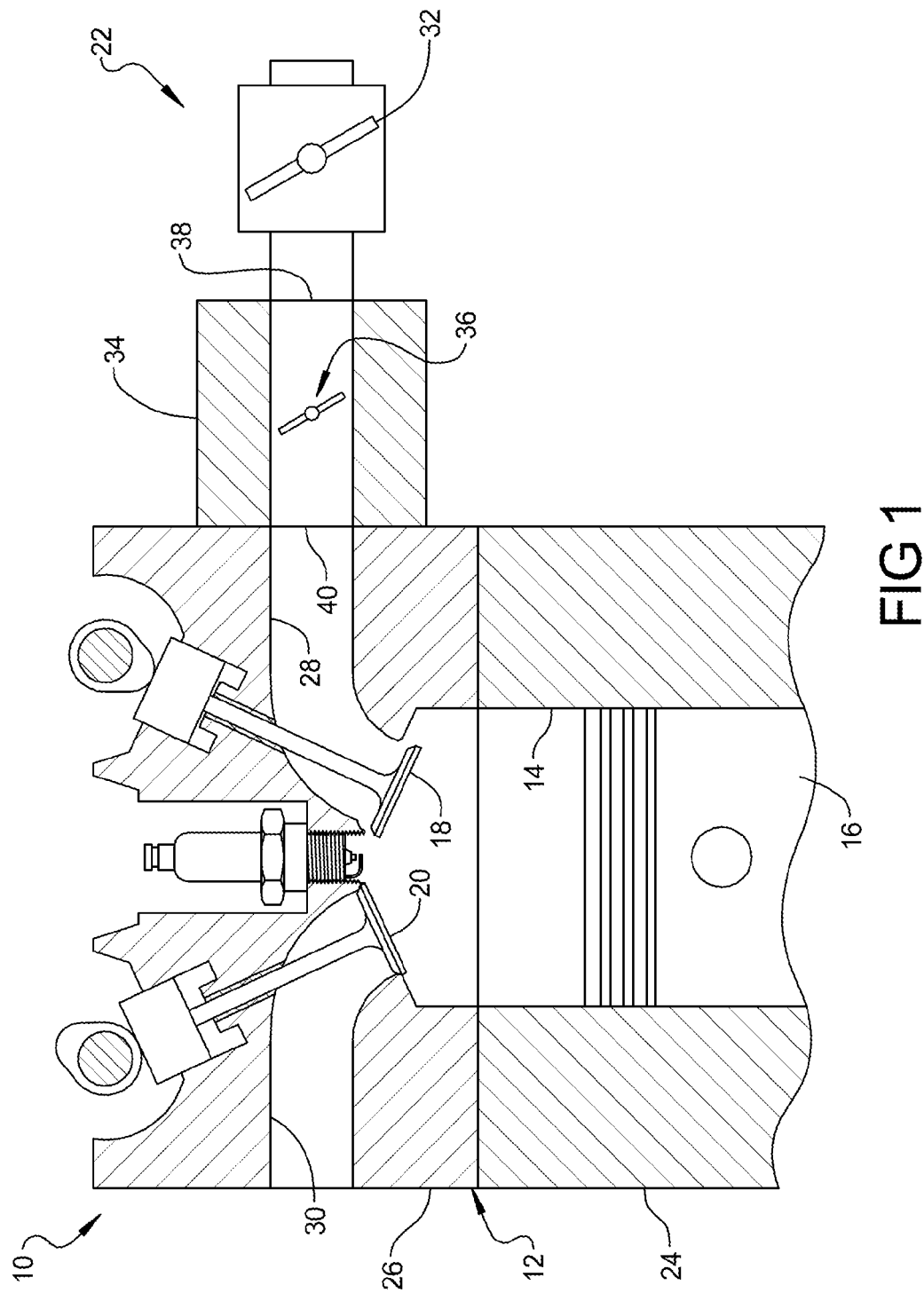
FIG. 1 is a schematic section view of an engine assembly according to the present disclosure.

With reference to FIG. 1, an engine assembly 10 is illustrated. The engine assembly 10 may include an engine structure 12 defining cylinders 14, pistons 16 disposed within the cylinders 14, intake and exhaust valves 18, 20 and an intake assembly 22. The engine structure 12 may include an engine block 24 defining the cylinders 14 and a cylinder head 26 coupled to the engine block 24. The cylinder head 26 may define intake and exhaust ports 28, 30. The intake valve 18 may be located in the intake port 28 and may control air flow into the cylinder 14 and the exhaust valve 20 may be located in the exhaust port 30 and may control exhaust gas flow from the cylinder 14.

Figure 2:
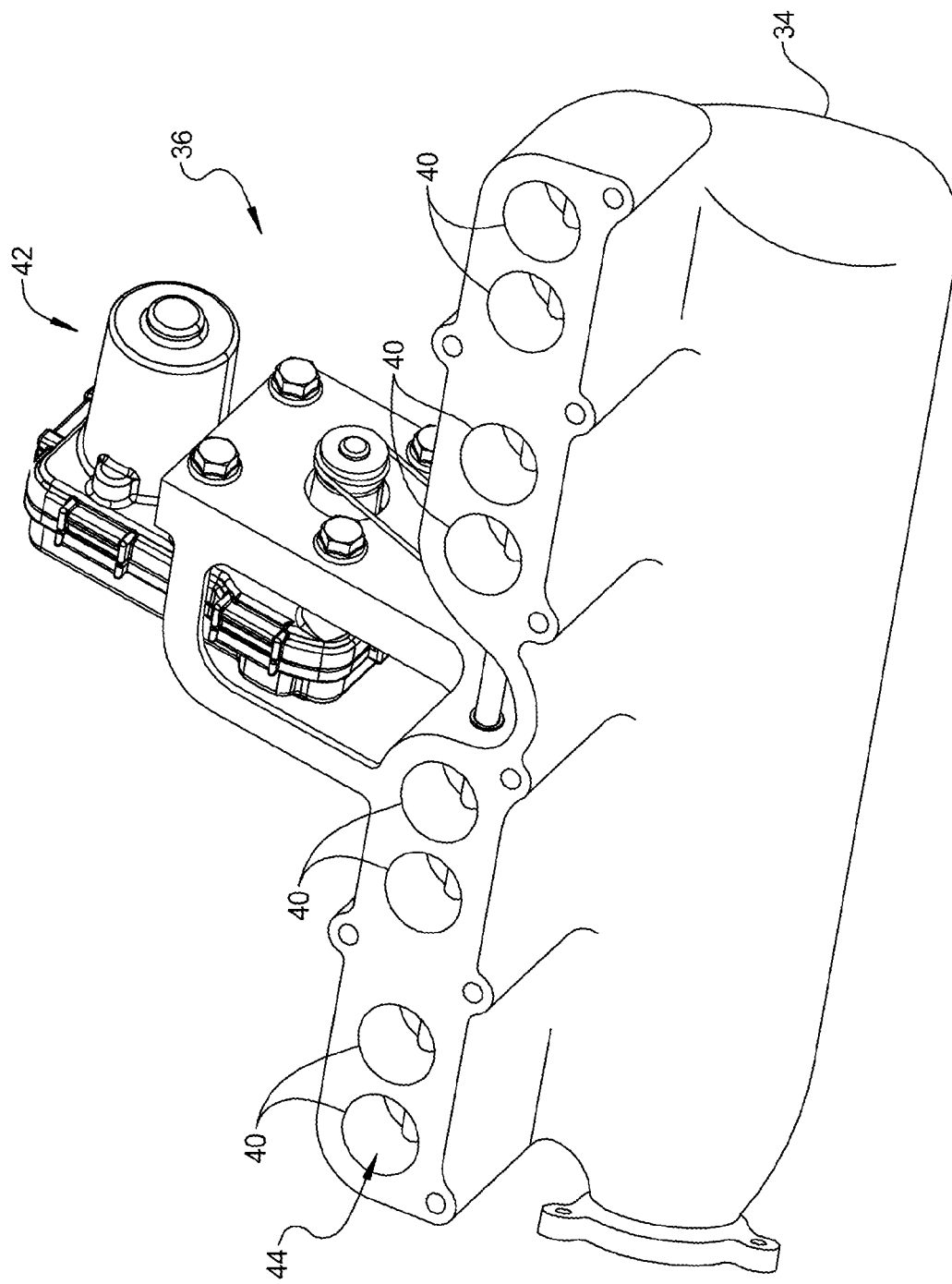
FIG. 2 is a perspective view of an intake manifold and an intake air flow control assembly from the engine assembly shown in FIG. 1.

The intake assembly 22 may include a throttle valve 32, an intake manifold 34 and an intake air flow control assembly 36. The intake manifold 34 may define an inlet 38 in communication with the throttle valve 32 and outlets 40 in communication with the intake ports 28. With additional reference to FIGS. 2 and 3, the intake air flow control assembly 36 may include an actuator 42, a mixture motion control valve 44, and a drive member 46. The actuator 42 may include a motor 48 and a drive shaft 50 rotationally driven by the motor 48.

The mixture motion control valve 44 may include a valve shaft 52, valve members 54, and a drive hub 56. The valve members 54 and the drive hub 56 may be fixed for rotation with the valve shaft 52. In the present non-limiting example, the mixture motion control valve 44 includes four valve members 54 spaced axially from one another along the length of the valve shaft 52. The valve members 54 may be located in the intake air flow path from the throttle valve 32 and the intake valves 18. In the present non-limiting example, the valve members 54 may be located in the outlets 40 of the intake manifold 34 with the valve shaft intersecting and extending through the intake manifold 34 at the outlets 40. The drive hub 56 may be a separate member fixed to the valve shaft 52 or may be an integrally formed region of the valve shaft 52.

The drive member 46 may be engaged with the drive shaft 50 and the valve shaft 52. More specifically, the drive member 46 may extend around an outer circumference of the drive shaft 50 and around an outer circumference of the valve shaft 52. In the present non-limiting example, the drive member 46 is fixed for rotation with the drive shaft 50 and the valve shaft 52.

The drive member 46 may include a cable and may be fixed to the drive shaft 50 by a first fastener 58 and may be fixed to the valve shaft 52 by a second fastener 60. The first fastener 58 may include a screw engaged with the drive shaft 50 and a washer 62 located between a head 64 of the screw and the drive shaft 50. The washer 62 may clamp the drive member 46 against the drive shaft 50. Similarly, the second fastener 60 may include a screw engaged with the drive hub 56 of the valve shaft 52. A washer 66 may be located between a head 68 of the screw and the drive hub 56, clamping the drive member 46 against the drive hub 56.

The drive shaft 50 may define a first rotational axis (A1) and the valve shaft 52 may define a second rotational axis (A2). The first and second rotational axes (A1, A2) may be parallel to one another and the drive member 46 may extend around the first and second rotational axes (A1, A2).

The motor 48 may power rotation of the drive shaft 50 about the first rotational axis (A1), driving rotation of the valve shaft 52 and valve members 54 about the second rotational axis (A2) to adjust air flow from the intake manifold 34 to the intake ports 28. The drive shaft 50 may be rotatable in first and second rotational directions opposite one another to drive rotation of the valve shaft 52 and valve members 54. Rotation of the drive shaft 50 in the first rotational direction may provide rotation of the valve shaft 52 and valve members 54 in the first rotational direction. Similarly, rotation of the drive shaft 50 in the second rotational direction may provide rotation of the valve shaft 52 and valve members 54 in the second rotational direction.

The drive shaft 50 may define a first radius (R1) perpendicular to the first rotational axis (A1). The valve shaft 52 may define a second radius (R2) at the drive hub 56. The second radius (R2) may be perpendicular to the second rotational axis (A2). The first radius (R1) may form a first moment arm during actuation of the intake air flow control assembly 36 and the second radius (R2) may form a second moment arm during actuation of the intake air flow control assembly 36. As a result, the first and second moment arms may be constant throughout actuation of the intake air flow control assembly 36. Therefore, the load on the motor 48 during actuation of the intake air flow control assembly 36 may be reduced relative to conventional linkage arrangements where the effective moment arm length varies throughout actuation due to displacement of the linkages relative to one another.

What is claimed is:

1. An intake air flow control assembly comprising:
    an actuator including a drive shaft defining a first rotational axis;
    a valve shaft defining a second rotational axis;
    a first valve member fixed for rotation with the valve shaft and adapted to adjust air flow from an intake manifold to an intake port of an engine; and
    a drive cable fixed to the drive shaft and to the valve shaft and extending around an outer circumference of the drive shaft and around an outer circumference of the valve shaft, the drive shaft being rotatable in first and second rotational directions opposite one another to rotate the valve shaft via the drive cable and rotationally displace the first valve member.

2. The intake air flow control assembly of claim 1, wherein the drive shaft defines a first radius perpendicular to the first rotational axis and the valve shaft defines a second radius perpendicular to the second rotational axis, the first radius forming a first moment arm during actuation of the intake air flow control assembly and the second radius forming a second moment arm during actuation of the intake air flow control assembly.

3. The intake air flow control assembly of claim 2, wherein the first and second moment arms are constant throughout rotation of the valve shaft.

4. The intake air flow control assembly of claim 2, wherein the actuator includes a motor and a drive shaft rotationally driven by the motor, engaged with the drive cable and defining the first rotational axis and the first radius.

5. The intake air flow control assembly of claim 1, wherein the drive cable is fixed to the drive shaft and the valve shaft by a first fastener and a first washer that clamps the drive cable to the drive shaft and a second fastener and a second washer that clamps the drive cable to the valve shaft.

6. The intake air flow control assembly of claim 1, further comprising a second valve member fixed for rotation with the valve shaft and axially spaced from the first valve member along the valve shaft.

7. The intake air flow control assembly of claim 6, further comprising the intake manifold, the intake manifold defining an inlet in communication with an air source, a first outlet housing the first valve member and a second outlet housing the second valve member.

8. The intake air flow control assembly of claim 7, wherein the valve shaft intersects the first and second outlets of the intake manifold and the drive cable extends around an outer circumference of the valve shaft at a location axially between the first and second valve members.

9. An engine assembly comprising:
    an engine structure defining a cylinder and an intake port in communication with the cylinder;
    an intake manifold in communication with an air source and the intake port;
    an intake valve supported on the engine structure and controlling communication between the intake port and the cylinder; and
    an intake air flow control assembly including:
        an actuator including a drive shaft defining a first rotational axis;
        a valve shaft defining a second rotational axis;
        a first valve member fixed for rotation with the valve shaft and adapted to adjust air flow from the intake manifold to the intake port; and a drive cable fixed to the drive shaft and to the valve shaft and extending around an outer circumference of the drive shaft and around an outer circumference of the valve shaft, the drive shaft being rotatable in first and second rotational directions opposite one another to rotate the valve shaft via the drive cable and rotationally displace the first valve member.

10. The engine assembly of claim 9, wherein the drive shaft defines a first radius perpendicular to the first rotational axis and the valve shaft defines a second radius perpendicular to the second rotational axis, the first radius forming a first moment arm during actuation of the intake air flow control assembly and the second radius forming a second moment arm during actuation of the intake air flow control assembly.

11. The engine assembly of claim 10, wherein the first and second moment arms are constant throughout rotation of the valve shaft.

12. The engine assembly of claim 10, wherein the actuator includes a motor and a drive shaft rotationally driven by the motor, engaged with the drive cable and defining the first rotational axis and the first radius.

13. The engine assembly of claim 9, wherein the drive cable is fixed to the drive shaft and the valve shaft by a first fastener and a first washer that clamps the drive cable to the drive shaft and a second fastener and a second washer that clamps the drive cable to the valve shaft.

14. The engine assembly of claim 9, further comprising a second valve member fixed for rotation with the valve shaft and axially spaced from the first valve member along the valve shaft.

15. The engine assembly of claim 14, further comprising the intake manifold, the intake manifold defining an inlet in communication with an air source, a first outlet housing the first valve member and a second outlet housing the second valve member.

16. The engine assembly of claim 15, wherein the valve shaft intersects the first and second outlets of the intake manifold and the drive cable extends around an outer circumference of the valve shaft at a location axially between the first and second valve members.

* * * * *